(12) United States Patent
Kleyman et al.

(10) Patent No.: US 7,945,685 B2
(45) Date of Patent: May 17, 2011

(54) CONTROLLED RELAY OF MEDIA STREAMS ACROSS NETWORK PERIMETERS

(75) Inventors: Ilya Kleyman, Kirkland, WA (US); Alexandru Gavrilescu, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 332 days.

(21) Appl. No.: 12/206,646

(22) Filed: Sep. 8, 2008

(65) Prior Publication Data

US 2009/0028146 A1 Jan. 29, 2009

Related U.S. Application Data

(62) Division of application No. 10/447,615, filed on May 29, 2003, now Pat. No. 7,454,510.

(51) Int. Cl.
*G06F 15/16* (2006.01)

(52) U.S. Cl. ......... 709/229; 709/245; 709/246; 709/249

(58) Field of Classification Search .................. 709/227, 709/229, 245, 246, 249
See application file for complete search history.

(56) References Cited

U.S. PATENT DOCUMENTS

| | | | |
|---|---|---|---|
| 6,829,654 B1 | 12/2004 | Jungck | |
| 7,003,555 B1 | 2/2006 | Jungck | |
| 7,007,093 B2 | 2/2006 | Spicer et al. | |
| 7,032,031 B2 | 4/2006 | Jungck et al. | |
| 7,072,341 B2* | 7/2006 | Xu et al. | 370/392 |
| 7,114,008 B2 | 9/2006 | Jungck et al. | |
| 7,133,923 B2 | 11/2006 | MeLampy et al. | |
| 7,173,928 B2 | 2/2007 | Xu et al. | |
| 7,406,709 B2 | 7/2008 | Maher et al. | |
| 7,454,510 B2* | 11/2008 | Kleyman et al. | 709/231 |
| 7,886,060 B2* | 2/2011 | Rosenberg | 709/227 |
| 2002/0143957 A1 | 10/2002 | Tanimoto | |
| 2004/0128554 A1* | 7/2004 | Maher et al. | 713/201 |
| 2004/0244010 A1 | 12/2004 | Kleyman et al. | |
| 2008/0126528 A1 | 5/2008 | Takeda et al. | |
| 2009/0116487 A1* | 5/2009 | Read | 370/392 |

* cited by examiner

*Primary Examiner* — Douglas B Blair
(74) *Attorney, Agent, or Firm* — Perkins Coie LLP

(57) ABSTRACT

The invention provides an apparatus and method to establish media sessions for media streams crossing a network boundary. The system includes a media relay controlled by a media configurator control module. The media relay reserves media paths (that include ports in the network boundary), opens the media paths, closes the media paths, and provides information about the media paths. A media configurator is adapted to communicate with the media configurator control module and the media relay. The control module has an event handler handling multimedia session events, a local address resolver that determines if an address identifier of the media session belongs to a private address space and a control element used to establish the media path. The control element manages resources for the media relay. A state-refresh timer is used to maintain state consistency between all media relays controlled by a proxy engine and control elements.

18 Claims, 9 Drawing Sheets

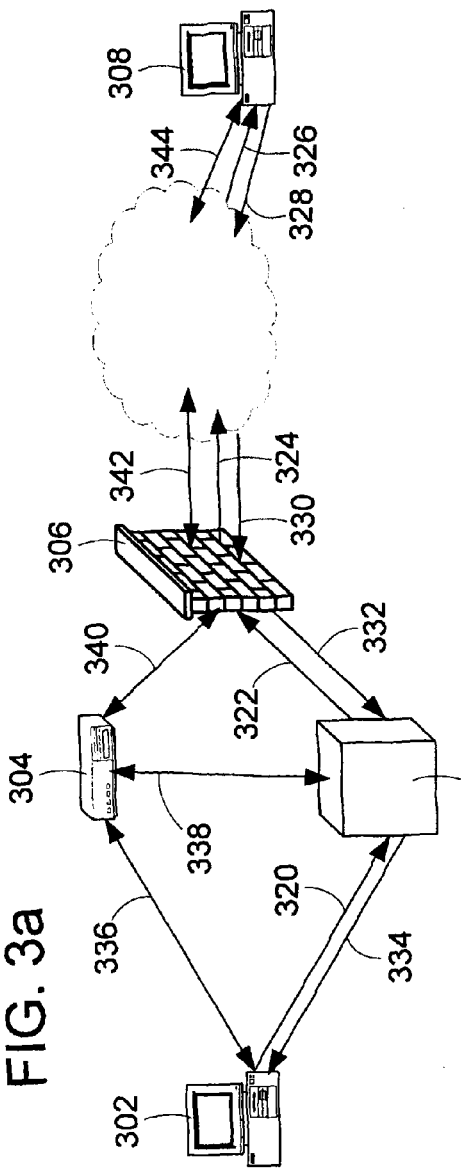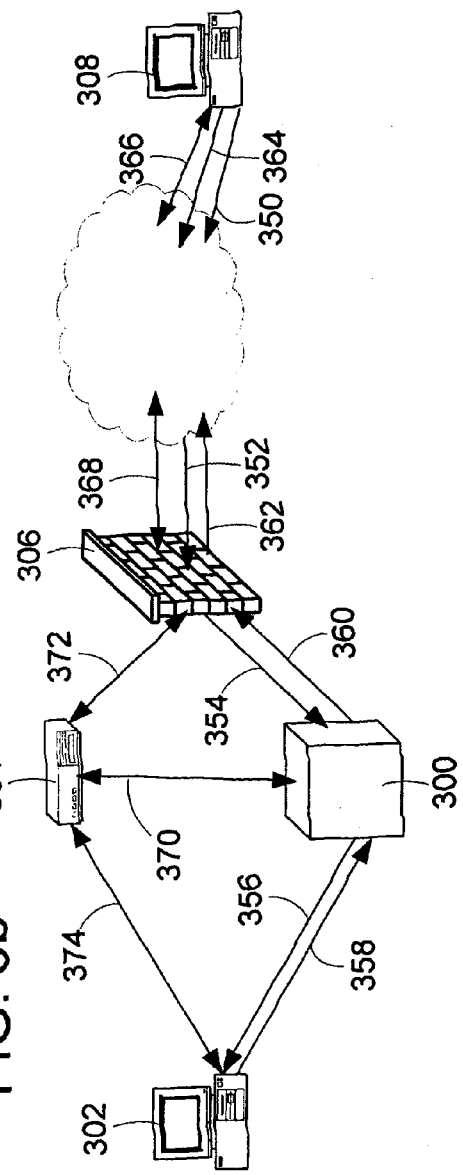

CONTROLLED RELAY OF MEDIA STREAMS ACROSS NETWORK PERIMETERS

CROSS REFERENCE TO RELATED APPLICATION

The present application is a Divisional of U.S. patent application Ser. No. 10/447,615, filed May 29, 2003, now U.S. Pat. No. 7,454,510 issued Nov. 18, 2008, and entitled "CONTROLLED RELAY OF MEDIA STREAMS ACROSS NETWORK PERIMETERS," which is incorporated herein in its entirety by reference.

FIELD OF THE INVENTION

This invention relates generally to electronic data processing, and, more particularly, relates to managing the flow of streaming data in across a network perimeter.

BACKGROUND OF THE INVENTION

Digitally based multimedia, the combination of video and audio in a digital format for viewing on a digital device is rapidly increasing in capacity and proliferation. Nearly every new personal computer manufactured today includes some form of multimedia. Sales of digital products such as cameras, video recorders, phones and televisions are steadily increasing. Multimedia is also becoming increasingly prevalent in the Internet realm as the growth of the Internet steadily and rapidly continues. Along with this growth has come increased performance expectations by the users of such computer equipment. These increased user expectations extend not only to hardware capability, but also to the processing capability of the data itself.

A technique known as streaming has been developed for multimedia applications to satisfy these increasing expectations. Streaming allows data to be transferred so that it can be processed as a steady and continuous stream. This has the benefit that data can be displayed or listened to before the entire file has been transmitted, a must for large multimedia files and for real-time media such as audio and video data.

One problem with streaming, and sending media in general, is passing the media across a network boundary. A network boundary is used to prevent undesirable penetration of a network. A network boundary is typically defined as an entity that physically terminates one network and/or interfaces with another network and that terminates one logical address space of one network and starts another logical address space in the other network. Industry responded to this problem and developed signaling protocols to send the media. Many signaling protocols used to send media implement signaling and session initiation on a primary channel with well-known address information and have provisions for initiation of media transfer on one or more secondary channels. The address information on the secondary channels is not fixed and is assigned dynamically. Because of the ephemeral nature of port assignments to the secondary channels, the network perimeter cannot be statically configured to allow for passage of media through the network perimeter. As a result, controlled opening and closing of "holes" in the perimeter must be implemented. In a point-to-point session, media can be originated on either end. If the endpoints are topologically located on different sides of the network perimeter, both endpoints may effect individual firewalls as a solution to let media pass through to the other endpoint.

Industry responded to this problem. Most multimedia sent over public networks typically use IP protocols. Multimedia data sent over IP protocols embed the IP addresses and ports in the protocol messages. One solution developed is to use an application level gateway (ALG) firewall. ALG firewalls are application aware firewalls that examine application protocol flows and only allow messages that conform to security policies to pass through. This type of firewall requires knowledge of the protocol so that it can extract, alter, or use address information (e.g., IP address and port). The ALG firewall can be designed to be protocol-aware for specific protocols. However, such ALG firewalls are potential bottlenecks in the network since they require additional logic and processing to parse and understand the application protocol.

Additionally, in systems where multimedia security schemes are implemented, the ALG firewall may not work. For example, if protocol messages are encrypted and the ALG firewall is not a trusted entity in possession of the necessary keys and algorithms, the ALG firewall will be unable to determine routing, security, etc. and will fail. Additionally, most firewalls deployed in networks today are not multimedia protocol-aware. These firewalls would have to be upgraded to become protocol-aware, which would be prohibitively expensive. Furthermore, in actual network operating environments, a series of firewalls and NAT devices is usually deployed along the traversal path of the multimedia streams. In order to ensure multimedia traversal, each firewall needs to be a protocol-aware ALG firewall. This means new investments and control changes to already deployed firewalls. As new versions of protocols are frequently released, the ALG firewalls need to be frequently upgraded to support new protocol versions. These control changes and frequent updates can lead to security breaches in the firewall, opening up a network to attacks.

BRIEF SUMMARY OF THE INVENTION

The invention provides a system and method to establish media sessions for media streams crossing a network boundary. The system includes a media configurator control module for controlling a media relay. The media relay reserves media paths (that include ports in the network boundary), opens the media paths and the ports, closes the media paths, and provides information about the media paths. A media configurator, which is a modular part of the mediator configurator control module, is adapted to communicate with the media configurator control module and the media relay.

The media configurator control module has an event handler that is adapted to handle multimedia session events received from a proxy engine. A local address resolver is in communication with the event handler and is adapted to determine if an address identifier of the media session belongs to a private address space and to determine a control element or a control group of control elements to be used to establish a media path with one end at the address identifier if the address identifier belongs to a private address space. The control element is an object that is in communication with the event handler. The control element manages resources for the media relay.

The media configurator control module also has a state refresh timer. The state refresh timer is adapted to find control elements for which a state consistency check has not been run for longer than a defined period of time. The state consistency check is used to maintain state consistency between a media relay and a control element associated with the media relay. The reason for running the check is that the media relay might run on a machine that is physically distinct from the one on which the media configurator control module is running. A state consistency check is initiated for each control element for which the state consistency check has not been run for longer than the defined period of time. The state consistency check comprises locking the control element, retrieving data on all address mappings established by the media relay the control element manages, and determining whether the media relay managed by the control element and the control element have the same information on the established address mappings. If a discrepancy is found between the mappings established by the media relay and the information of the mappings mapped by the control element, all ports associated with mappings that are mapped by the control element but are not in the current mappings in the media relay are released and mappings that are in the media relay but are not in the control element mappings are conditionally reserved. The control element is then unlocked.

The multimedia session events include a Session Initiated message, a Session Confirmed message, a Session Established message, a Session Changed message, and a Session Terminated message. The event handler, in response to receiving the session initiated message, determines via the local address resolver whether the media stream crosses the boundary between private and public address spaces, reserves a media path for the media stream if the media stream does cross the boundary, sends a media path reservation request to a media configurator via the at least one control element for the media configurator to reserve the media path including at least one port, stores the reservations made for the reserved ports in a temporary storage if the reservation request is successful, modifies a session description so that address identifiers advertised for the stream are changed to reserved address identifiers, and sends a modified session description to a proxy engine.

The event handler, in response to receiving the session confirmed message, retrieves reserved public address parameters for the media path, sends a media path open request to the media configurator with the reserved public address parameters, modifies a session description to refer to opened paths for the media path if the media path open request is successful, and sends the modified session description to the proxy engine.

The event handler, in response to receiving the session terminated message, obtains address parameters for the opened media paths for the media session, sends a request to close the media path with the address parameters to a media configurator and sends a terminate session message to the proxy engine after the opened media paths have been closed.

The media relay is controlled with commands that are sent to the media configurator. The commands, which form an application programming interface (API), include an initialize command to initialize a media configurator and provide a network name of the media relay, a reservemediapath command to reserve a specified media path, an openmediapath command to open the specified media path, and a closemediapath command to close the specified media path. Additionally, a closeallmediapaths command is used to close all media paths created by the media configurator, and a querymediapathinformation command is used to obtain information about a media path.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3a is a block diagram generally illustrating the steps of establishing a media session initiated by a user in a private address space in accordance with the teachings of the present invention;

FIG. 3b is a block diagram generally illustrating the steps of establishing a media session initiated by a user in a public address space in accordance with the teachings of the present invention;

DETAILED DESCRIPTION OF THE INVENTION

Figure 1:
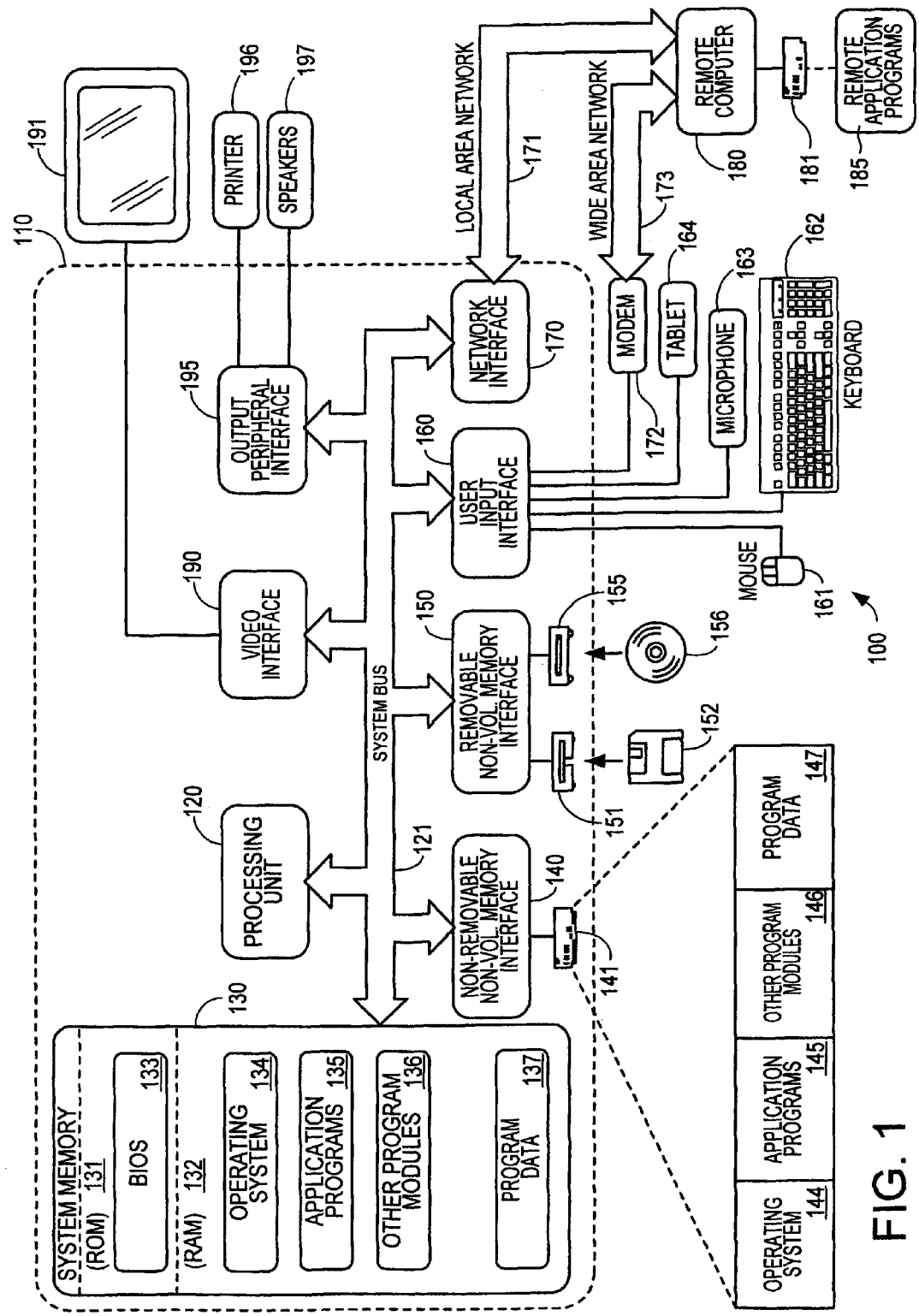
FIG. 1 is a block diagram generally illustrating an exemplary computer system on which the present invention resides.

The invention provides a system and method to pass real-time multimedia, such as audio and video data, through a network perimeter in either or both directions. The media relay of the invention dynamically configures a firewall that is in the media path to allow the media to flow in one or both directions and translates address information embedded in the headers (e.g., UDP/IP, TCP/IP, etc.) of secondary channels where the media is to flow. The media relay manages ranges of ports and IP addresses on behalf of a firewall. A media control module is used to interface between the media relay and the server operating system on which the server engine or proxy engine of a real time communication (RTC) server is running. This enables systems with already deployed firewalls to continue to use the firewalls as signaling protocols change or new protocols are developed. As an example, the server engine may be the server engine of the Microsoft® Real-Time Communication Server 2003 by Microsoft Corporation.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware. The session initiation protocol (SIP) (RFC 2843) will be used to describe the invention. Message names between components of the invention and other components will use SIP names. It is understood that other protocols and message names may be used.

Figure 2:
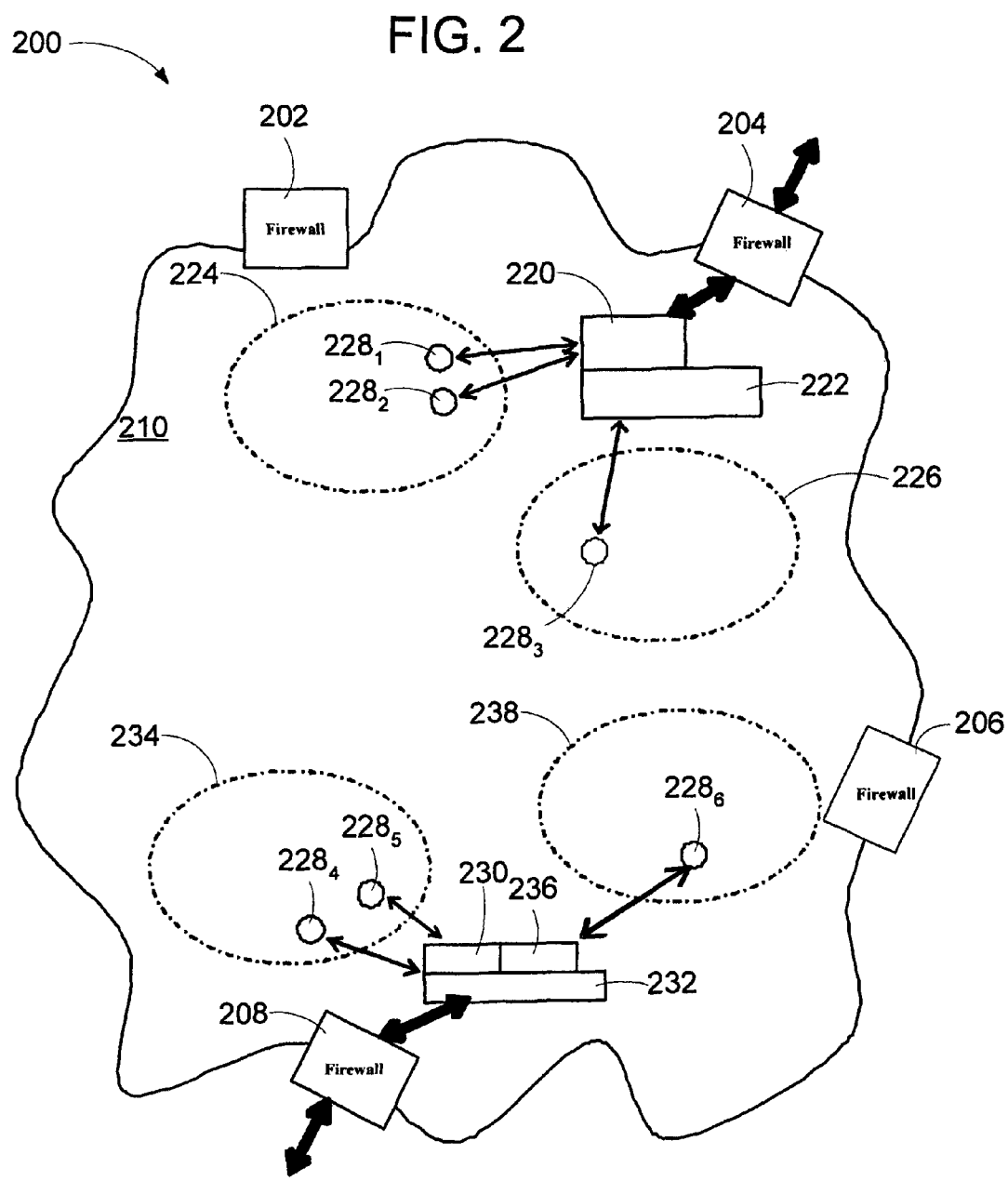
FIG. 2 is a block diagram generally illustrating an exemplary environment in which the present invention operates.

Turning now to FIG. 2, an exemplary example of a suitable operating environment 200 in which the invention may be operated is shown. FIG. 2 illustrates several ways in which the invention may be deployed. Firewalls 202, 204, 206, 208 are located at the perimeter of enterprise 210. The media relay 220 is controlled by proxy engine 222 and serves logical domains 224, 226 having media sink/sources $228_1$-$228_3$. Media relay 230 is controlled by proxy engine 232 and serves logical domain 234 having media sink/sources $228_4$-$228_5$. Media relay 236 is controlled by proxy engine 232 and serves logical domain 238 having media sink/sources $228_6$. It should be understood that a proxy engine may serve a single media relay or multiple media relays and multiple proxy engines may control a single media relay (when address resources assigned to each proxy engine are disjoint) or multiple media relays. It should also be understood that the operating environment 200 is only one example of a suitable operating environment and is not intended to suggest any limitation as to the scope of use or functionality of the invention. Neither should the operating environment 200 be interpreted as having any dependency or requirement relating to any one or combination of components illustrated in the exemplary operating environment 200.

Turning now to FIGS. 3a and 3b, during operation, invite requests (i.e., a request sent to a user (or service) requesting participation in a session between a sender and a recipient) are sent to the proxy engine 300. On outbound calls, the invite request is sent from the client 302 (line 320). The proxy engine 300 extracts media IP address and ports and stores them. It reserves a public identifier from an address resource pool to be used when the session is established (i.e., a pool of public UDP/IP or TCP/IP addresses and ports that are for the establishment of media traffic). The proxy engine 300 also modifies the session description protocol (SDP) "blob" to change the media address/port of the invite request to the public address/port of the media relay 302. The proxy engine 300 passes the modified invite request to the public client 308 via firewall 306 (lines 322-326). Client 308 responds with an OK (lines 328, 330). The firewall 306 forwards the OK to proxy engine 300 (line 332). The proxy engine 300 extracts the media IP address and ports from the OK message and stores them. It also modifies the SDP "blob" so that the media address/port is changed to the private address/port of the media relay 304. The proxy engine forwards the OK to client 302 (line 334). After receiving the ok, client 302 starts the media (line 336) and sends an ACK. Proxy engine 300 receives the ACK and sends a request (line 338) to media relay 304 with the information it stored (media IP addresses and ports). The media relay 304 establishes address mapping for RTP and RTCP streaming to flow between clients 302, 308. The ACK arrives at client 308 (lines 340-344) and client 308 starts media flow if the media flow is bidirectional. Media flows on lines 336-344.

On inbound calls, the invite request is sent from client 308 on the public network (line 350). The invite request arrives at the firewall 306 (e.g., to port 5060 of the firewall) (line 352). It should be recognized that the firewall has to be configured such that inbound connections sent to port 5060 are sent to the RTC server on which the media configurator control module resides in the private address space. Existing firewalls allow for such mapping to be established. The firewall 306 passes the invite request to the proxy engine (line 354). The proxy engine 300 extracts media IP address and ports and stores them. It reserves a public identifier from the address resource pool to be used when the session is established. The proxy engine 300 also modifies the session description protocol (SDP) "blob" to change the media address/port of the invite request to the public address/port of the media relay 302. The proxy engine 300 passes the modified invite request to client 302 (line 356). Client 302 responds with an OK (line 358). The proxy engine 300 extracts the media IP address and ports from the OK message and stores them. It also modifies the SDP "blob" so that the media address/port is changed to the private address/port of the media relay 304. The proxy engine forwards the OK to client 308 via firewall 306 (lines 360-364). After receiving the ok, client 308 starts the media (line 366) and sends an ACK. Proxy engine 300 receives the ACK and sends a request (line 370) to media relay 304 with the information it stored (media IP addresses and ports). The media relay 304 establishes address mapping for RTP and RTCP streaming to flow between clients 302, 308. The ACK arrives at client 302 and client 302 starts media flow if the media flow is bidirectional. Media flows on lines 366-368, 372-374.

Figure 4:
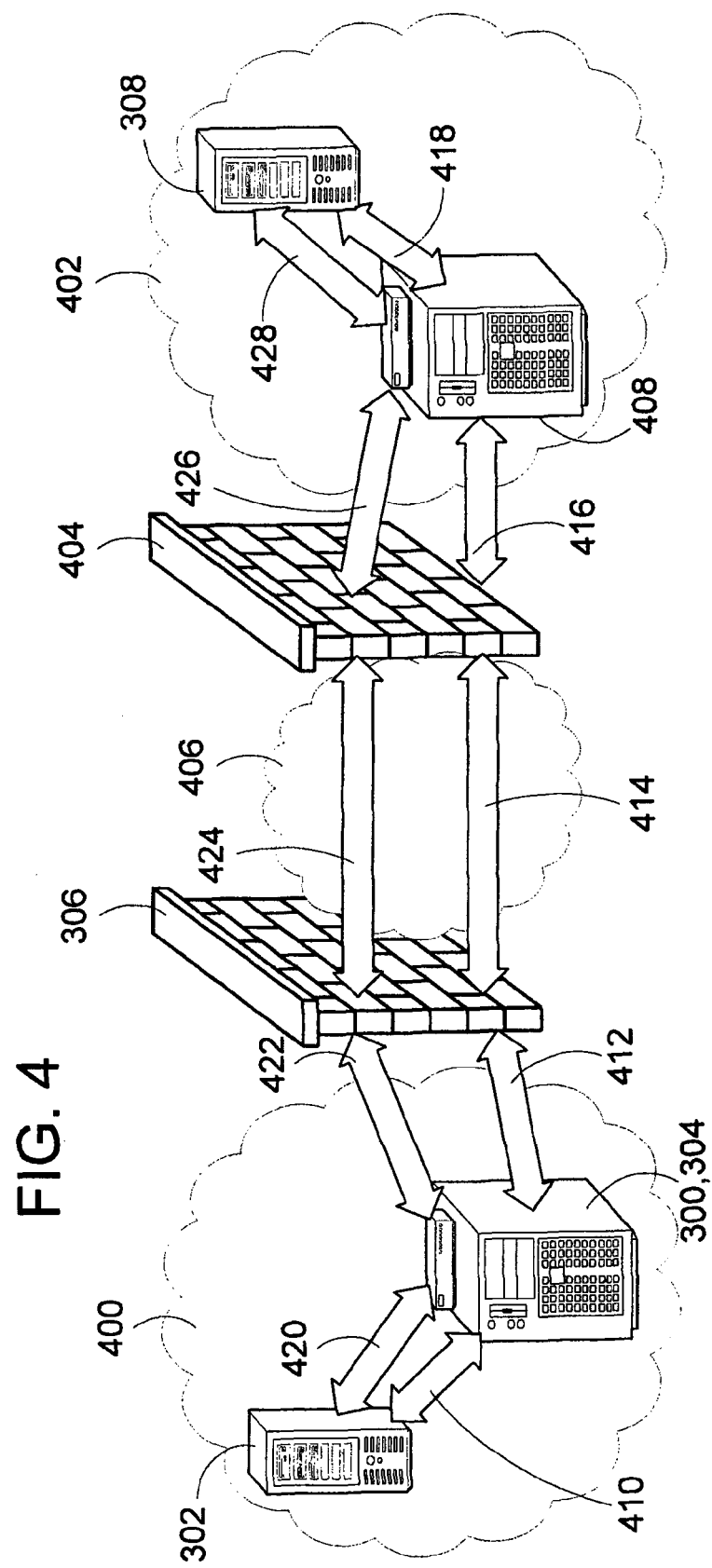
FIG. 4 is a block diagram generally illustrating the steps of establishing a media session when the clients of a media session are in different private address spaces in accordance with the teachings of the present invention.

Turning now to FIG. 4, a similar control flow happens when both clients are located in private networks. In FIG. 4, client 302 is in private network 400 behind firewall 306 and client 308 is in private network 402 behind firewall 404. Between firewalls 306, 404 is public network 406 such as the Internet. Network 402 has proxy engine/media relay 408. Control messages to set up the media session are sent via lines 410-418 and media streams flow on lines 420-428. The proxy engine/media relays receive the invite requests and modify the SDP "blobs" so that media streams flow to the media relays prior to the clients as previously described.

Figure 5:
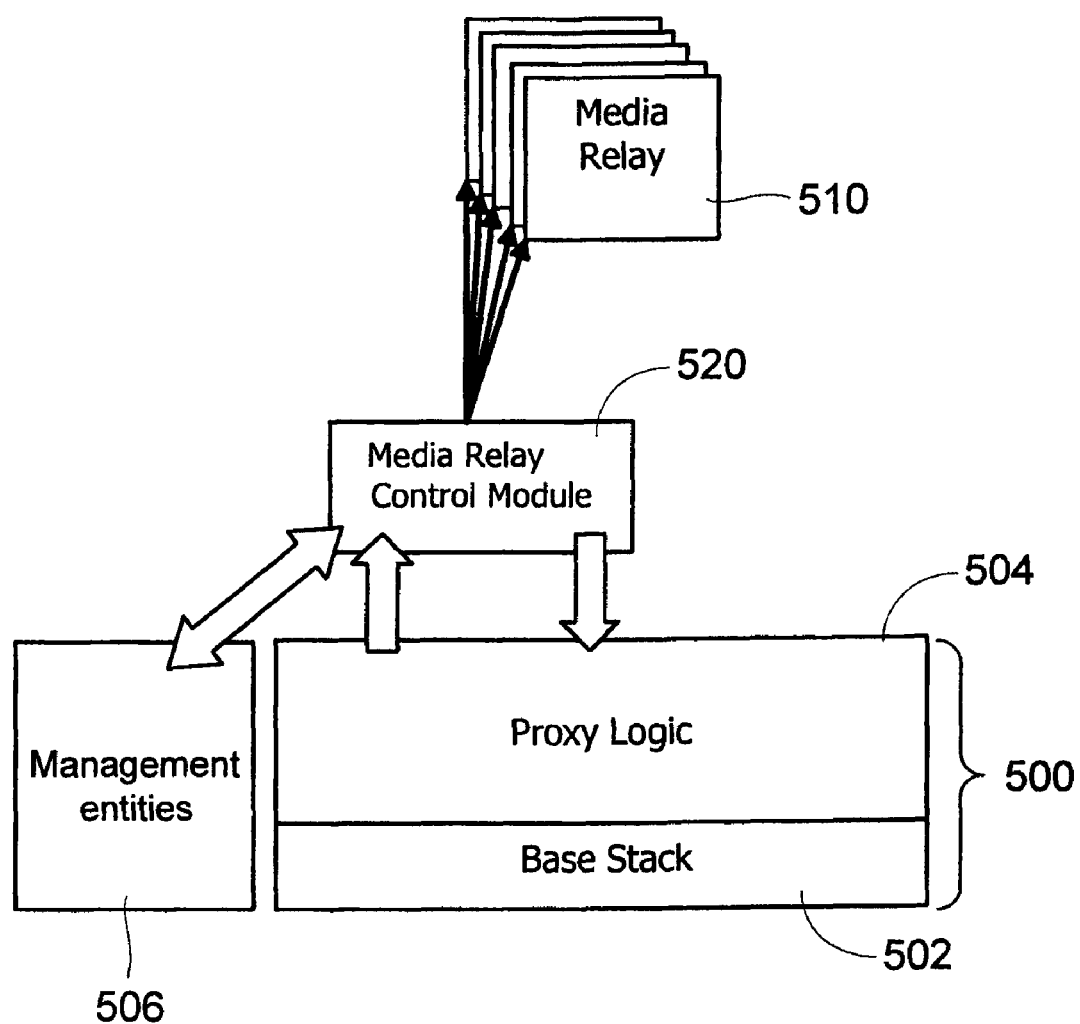
FIG. 5 is a block diagram illustrating how components of the invention interface with components of a real-time communication server.

There are numerous types of firewalls that have been installed and that are being developed. Many of these firewalls have their own proprietary software to interface with routers, clients, etc. Turning now to FIG. 5, the proxy engine 500 communicates with media relays 510 via media control module 520. The media control module 520 extracts media routing information (IP address, UDP port) from relevant messages (e.g., invite requests), directs a media relay 520 to establish/relinquish NAT (network address translator) mappings from media flows, and communicates information about established NAT mappings to the proxy engine 500.

The proxy engine 500 includes a base stack 502 and proxy logic 504. The base stack 502 transforms raw character streams received from Winsock (over TCP or UDP transport) or the like into a stream of protocol messages. For example, if the base stack 502 is a SIP base stack, it transforms the raw character streams into streams of SIP messages. The proxy logic dispatches the protocol messages (e.g., SIP messages) to extension modules that have registered for transaction events, multimedia session events, or call events. The media relay control module 520 is classified as an extension module. The media relay control module 520 registers with the proxy engine 500 for delivery of all multimedia session events. When the proxy engine 500 detects a multimedia session event for which a media relay control module has registered, it notifies the media relay control module and passes the message to the media relay control module. The media relay control module 520 extracts necessary information from the message, determines which media relay 510 to contact, and sends a request to the media relay 510 to do one of the following: make provisions to allow bi-directional media flows according to the parameters specified in the message; open bi-directional media path(s) for the session to which the message belongs; close bi-directional media path(s) for the session to which the message belongs; or retrieve statistics of interest for the proxy engine 500.

The management entities 506 provide management services for the extension modules. These management services include module startup and shutdown, storing and restoring of module configuration when the entire system starts or shuts down, and mechanisms for dynamic changes in module configuration. Examples of management entities are administration modules, SIP module controllers, command-line interpreter, and graphical UI support module.

Figure 6:
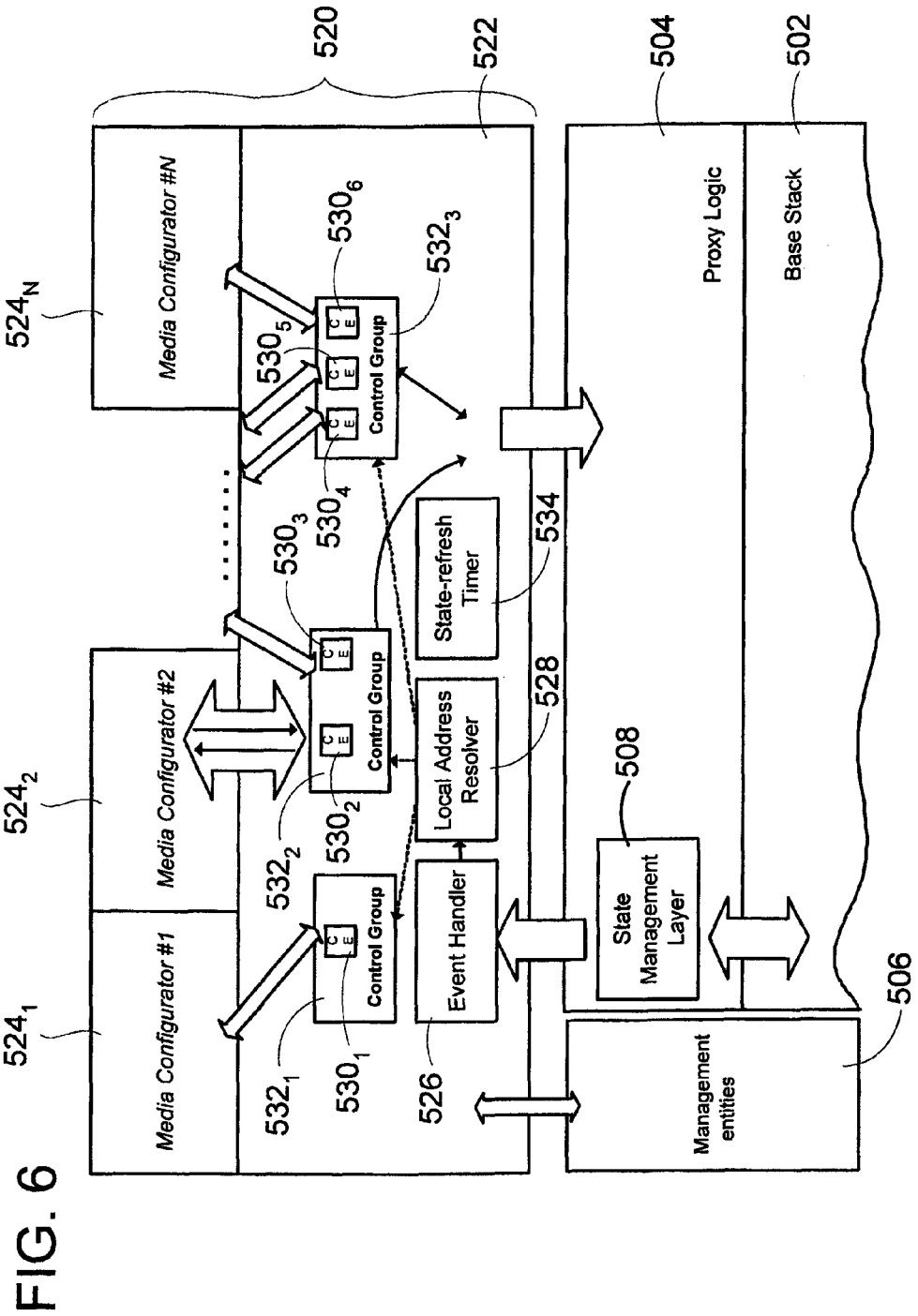
FIG. 6 is a block diagram of the media relay control module of the present invention.

Turning now to FIG. 6, the media relay control module 520 consists of a translation management layer 522 and media configurators $524_1$-$524_N$. The translation management layer 522 manages address resources assigned to all media relays 510 managed by the proxy engine 500. The translation management layer 522 performs several logical functions. It receives multimedia session events and associated protocol messages (e.g., SIP messages) from the proxy engine 500 and extracts information about the media streams advertised in the delivered messages. The translation management layer 500 determines whether media streams in a media session cross private/public boundary of the enterprise network. If a media stream in the session crosses private/public boundary of the enterprise, the translation management layer 522 determines which media configurator will control the media path for the stream. The translation management layer 522 transforms session events into appropriate requests to reserve, open, or close a media path. It then forwards the requests to the selected media configurator and performs necessary actions if the media configurator was unable to open or close the media path for a stream. The media configurators $524_1$-$524_N$ is an entity that implements communication between the proxy engine 500 and a media relay. Each media configurator uses a control protocol understood by the corresponding media relay(s) to communicate with the corresponding media relay(s).

As previously indicated, the management entities 506 provide management services. For the media control module 520, these management services include start, stop, store, restore, initialize, and shutdown commands. The state management layer 508 receives the stream of protocol messages from the base stack 502 and dispatches the protocol messages to event handler 526. For example, if the base stack is a SIP base stack, the protocol messages may include invite requests, OK messages, ACK messages, BYE messages, and CANCEL messages. The state management layer 508 transforms the protocol messages into Session Initiated, Session Confirmed, Session Established, Session Changed, and Session Terminated messages.

The event handler 526 provides handling of multimedia events delivered by the proxy engine 500. The local address translator 528 determines for a given address identifier (IP address or domain name) whether the address identifier belongs to the private address space. It uses a local address database of addresses in the private domain(s) and a local domain database of domains controlled by the media control module 520. If the address identifier belongs to the private address space, the local address translator 528 determines which control element 530 or control group should be used to establish media paths.

A control element 530 is an abstract object of a media relay 510 created by the translation management layer 522 in order to represent a single media relay 510 with all resources allotted to it. The control element 530 has full knowledge of address resources assigned to the media relay and manages those resources on the media relay's behalf. The information the control element has includes the control IP address of the media relay, its domain name, range of private addresses the media relay servers, ranges of public address identifiers (i.e., public IP addresses and port-ranges) assigned to the media relay, control protocol to be used to communicate with the media relay, and other configuration information about the media relay. For load balancing purposes, control elements combine to form a control group 532. A control group 532 is a collection of control elements that serve the same subset (i.e., logical domain) of private address identifiers. Control groups are created to distribute load from heavily populated logical domains among multiple relays and/or firewalls.

For example, control group $532_1$ includes control element $530_1$ that interfaces with media configurator $524_1$ to communicate with a media relay. Similarly, control group $532_2$ includes control elements $530_2$ and $530_3$ and control group $532_3$ includes control elements $530_4$, $530_5$, and $530_6$. When private address ranges are provided to a media relay control module to handle, the local address translator instantiates a control group 530 for each range. The reference to the control group is associated with the address range and stored in the databases.

State-refresh timer 534 is an entity that maintains state consistency between all media relays controlled by the proxy engine 500 and control elements 530. The need for state consistency is due to the fact that a media relay 510 may run on a machine that is physically distinct from the machine on which the proxy engine 500 is running, which can lead to "stale" connections. When scheduled, the state-refresh timer finds those control elements for which state consistency check has not been run for longer than a defined period of time. For each control element, the timer 534 then initiates a state consistency check. The state consistency check locks the control element, retrieves data on all address mappings established by the media relay the control element manages, and then determines whether both the media relay 510 and control element 530 have exactly the same information on the established address mappings. If a discrepancy is found between the mappings established by the media relay and the information of the mappings mapped by the media relay's control element, the timer 534 tries to account for the inconsistency. It releases ports associated with mappings that are mapped by the control element but are not in the current mappings in the media relay and conditionally reserves mappings that are in the media relay but are not in the control element mappings. The timer 534 then unlocks the control element.

Figure 7:
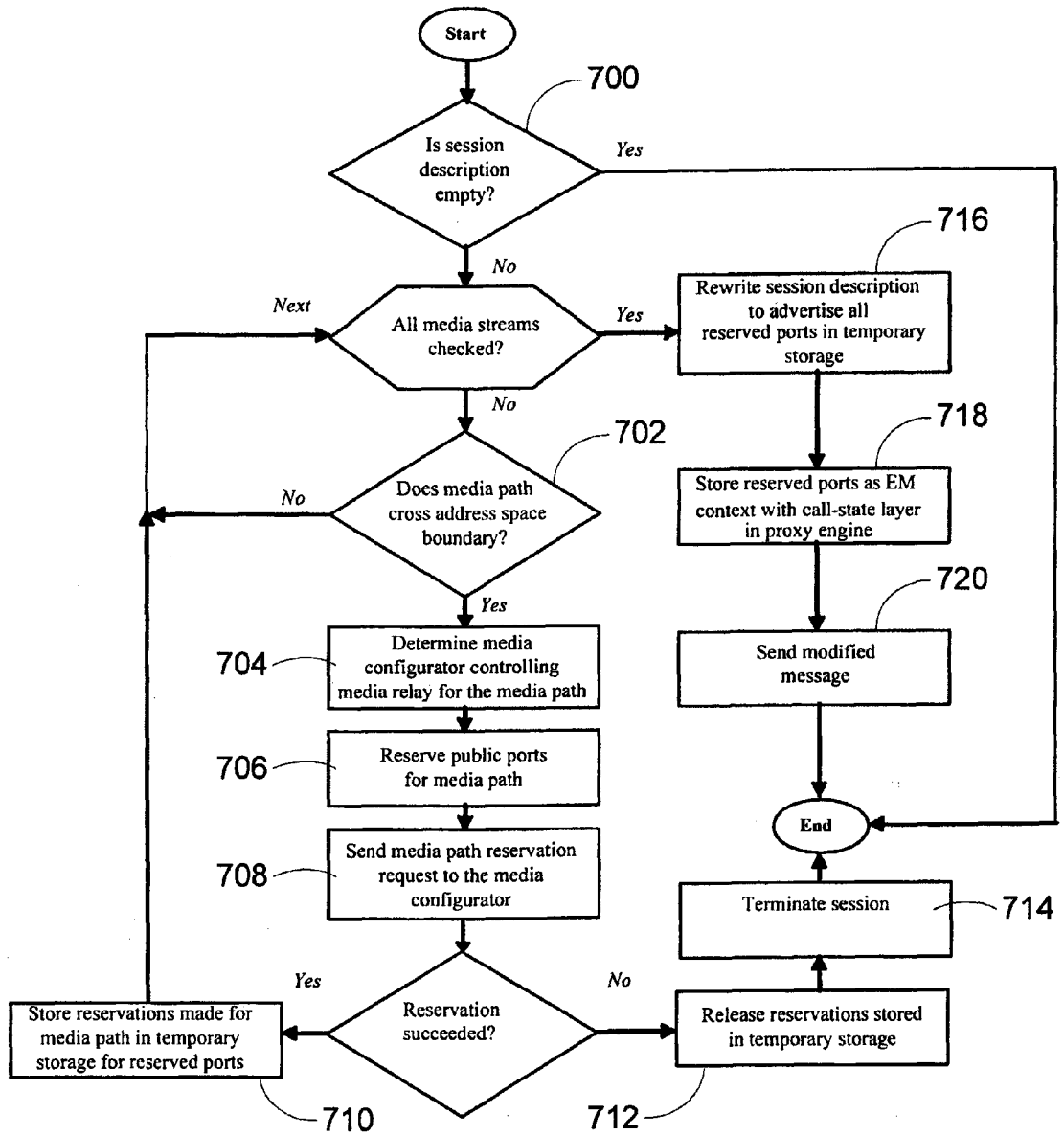
FIG. 7 is a flowchart illustrating the steps the media relay control module takes to initiate a media session.

As previously indicated, the event handler 526 provides handling of multimedia events delivered by the proxy engine 500. The messages delivered include Session Initiated, Session Confirmed, Session Established, Session Changed, and Session Terminated messages. When the proxy engine 500 receives an Invite message, it sends a session initiated message to the event handler 526. Turning now to FIG. 7, the event handler 526 executes a session initiated reservation routine. It determines if the session description from the session initiated message is empty (step 700). If the session description is empty, no ports are reserved. If the session description is not empty, then for each media stream advertised in the session description the event handler 526 determines via the local address resolver 528 whether the media stream crosses the boundary between private and public address spaces (step 702). If the media stream does not pass the boundary, then the media path for the stream is already open and the next media stream is checked. If the media stream does pass the boundary, the media path for the media stream is reserved. This is done by determining the media configurator that is responsible for reserving the media path for the stream (step 704). Public ports for the media path are reserved (step 706). A media path reservation request is sent to the media configurator via the appropriate control element (step 708). If the reservation request is successful, the reservations made for the reserved ports are stored in a temporary storage (step 710). The session description is modified so that address identifiers advertised for the media stream have meaning to the receiving party. If this fails, all media path reservations previously made for the session are released (step 712) and the proxy engine is notified that the session should be terminated (step 714).

If at least one media stream in the session crosses the address space boundary, the session description is modified so that address identifiers advertised for the stream are changed for those reserved from the address resource pool (step 716). The reserved ports are used to form EM (extension module) session context for the signaling session and deliver it to the proxy engine 500 for storage as EM context (step 718). The modified message is sent to the remote client (step 720).

Figure 8:
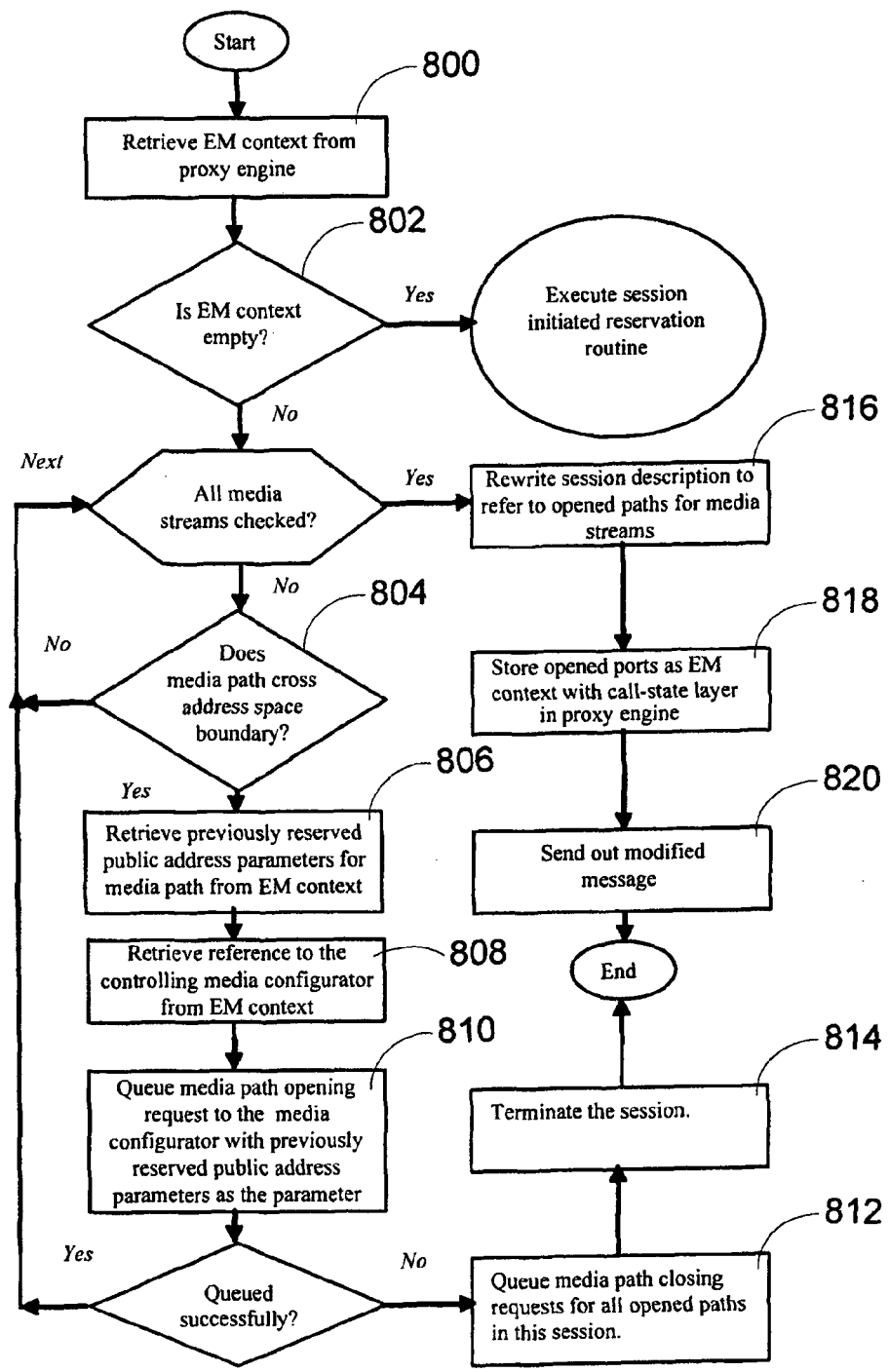
FIG. 8 is a flowchart illustrating the steps the media relay control module takes to open a media session.

When the proxy engine 500 receives an OK reply, it sends a session confirmed message to the event handler 526. Turning now to FIG. 8, the event handler executes a session confirmed resource committal routine. The EM context is retrieved from the proxy engine (step 800). It determines if the EM context is empty (step 802). If the EM context is empty, the session initiated reservation routine is run (see FIG. 7). If the EM context is not empty, then for each media stream advertised in the session description, the event handler 526 determines via the local address resolver 528 whether the media stream crosses the boundary between private and public address spaces (step 804). If the media stream does not pass the boundary, then the next media stream is checked. If the media stream does pass the boundary, the previously reserved public address parameters for the media stream from the EM context is retrieved (step 806). The reference to the controlling media configurator is retrieved from the EM context (step 808). A media path opening request is sent (i.e., queued) to the media configurator with the previously reserved public address parameters as the parameter (step 810). If the queuing is successful, the next media stream is checked. If the queuing fails, media path closing requests are queued for all opened paths in the session (step 812) and the proxy engine is notified that the session should be terminated (step 814).

If at least one media stream in the session crosses the address space boundary, the session description is modified to refer to the opened paths for media streams (step 816). The opened ports are "stored" as EM context for the signaling session and delivered to the proxy engine 500 for storage as EM context (step 818). The modified message is sent to the remote client (step 820).

Figure 9:
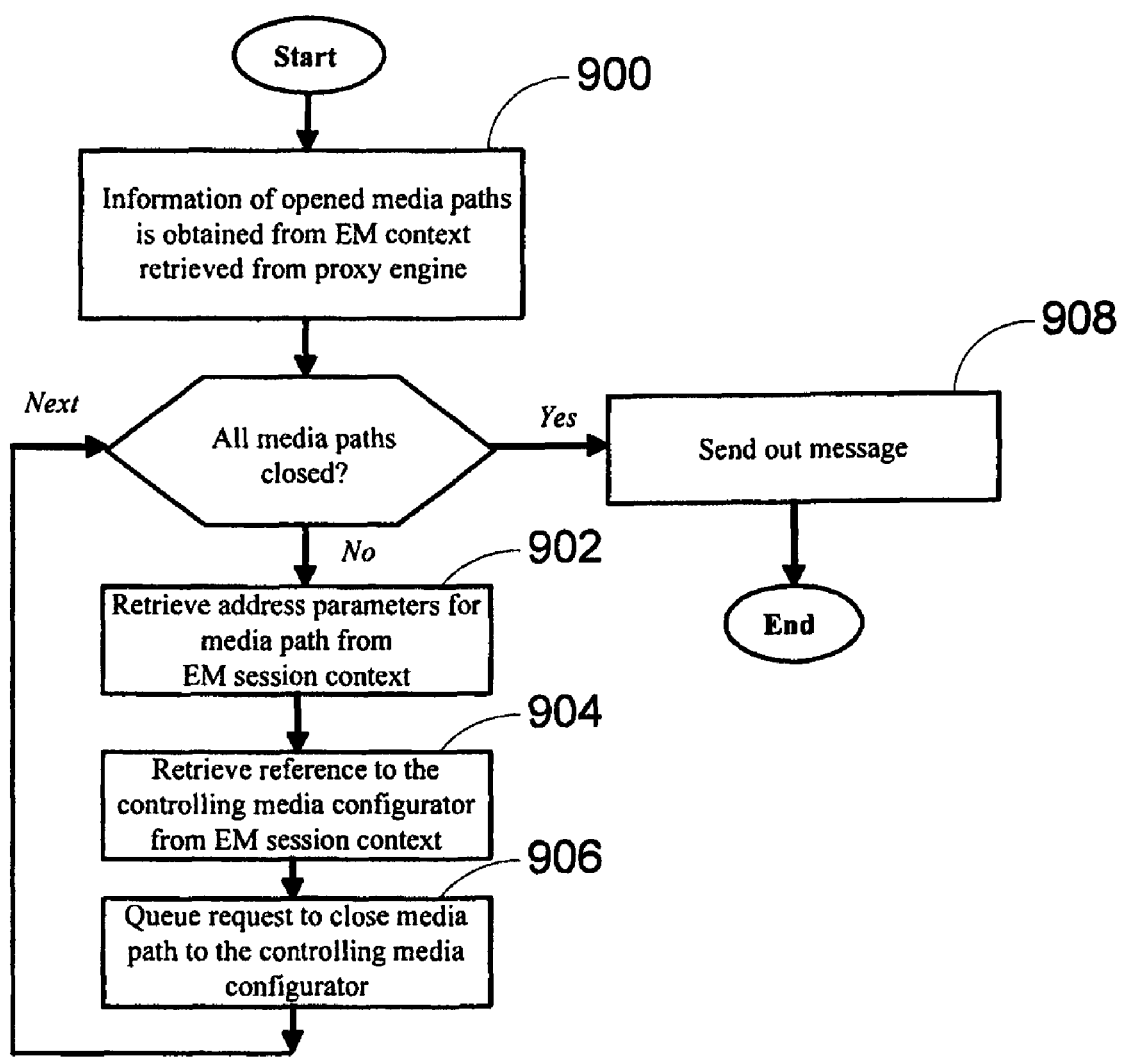
FIG. 9 is a flowchart illustrating the steps the media relay control module takes to terminate a media session.

When a session is terminated, the proxy engine 500 sends a session terminated message to the event handler 526. Turning now to FIG. 9, the event handler executes a session terminated routine. Information on opened media paths is obtained from the EM context that is retrieved from the proxy engine 500 (step 900). For each media path opened for the session, the address parameters for the media path are retrieved from the EM session context (step 902). The reference to the controlling media configurator is also retrieved from the EM session context (step 904). A request to close the media path is sent to the controlling media configurator (step 906) to command the media relay to close the media path. After all of the media paths have been closed, a terminate session message is sent to the proxy engine 500 (step 908).

As previously indicated, the media configurators $524_X$ are generally responsible for communicating control requests to a media relay 510. Typically, one media configurator exists for every NAT control protocol. A media configurator may communicate with the firewall to create dynamic openings. A media configurator does the following: receive requests from the translation management layer 522 (via a control element) for transmittal to the media relay (via an IMediaConfigurator interface); converts the request into a format specific to the control protocol the module supports; sends the request to the media relay; sends a request to create a dynamic opening to the firewall; receives reply from a media relay; converts the reply from the format specific to the control protocol the configurator supports into the format that the control element understands; and forwards a converted reply to the translation management layer.

All media configurators implement a programming interface. The commands to the programming interface include Initialize, ReserveMediaPath, OpenMediaPath, CloseMediaPath, CloseAllMediaPaths, QueryMediaPathInformation, and Shutdown. The Initialize command initializes the media configurator and provides the network name of the media relay. Upon initialization, the media configurator creates and initializes its private data structures and establishes a control channel with the media relay and firewall. The command returns an ok if a media path was successfully reserved. If not successful, an error code is returned. The ReserveMediaPath command reserves a media path and provides a complete or partial specification of the media path to be reserved. The command returns a success message if a media path was successfully reserved. If not successful, an error code is returned.

The OpenMediaPath command opens a media path as specified with supplied parameters. The supplied parameters are the complete specification of the media path to be opened. The media configurator conveys a path open request to the media relay (to commit the mapping previously reserved) and to the firewall to open the port. The media path should have been previously reserved. The command returns a success message if a media path was successfully opened. If not successful, an error code is returned.

The CloseMediaPath command closes a media path. The handle to the media path is supplied with the command. The media configurator communicates with the media relay to remove the mappings that have been previously established for the media path and with the firewall to close the public port that was previously opened for the media path. The command returns a success message if a media path was successfully closed. If not successful, an error code is returned.

The CloseAllMediaPaths command closes all media paths created through the media configurator. The media configurator communicates with the media relay to remove all the mappings that have been previously established by the media configurator and with the firewall to close all public ports opened by the firewall on the media configurator's behalf.

The QueryMediaPathInformation command is used to obtain information about a media path. A handle to the media path whose information is being retrieved and the length of the media data path is supplied. A pointer to the memory where the information to be delivered is also supplied. The command returns a success message if media path information was successfully retrieved. If not successful, an error code is returned. The Shutdown command shuts down the media configurator. All resources taken are deallocated.

It can be seen that a system and method to pass real-time media through a network perimeter has been presented. While described in terms of the Session Initiation Protocol, the invention can also be applied to other signaling protocols. The media relay of the invention manages ranges of ports and addresses on behalf of a firewall, thereby simplifying the design of firewalls. The media relay control module of the invention used to communicate with the media relay allows administrators to use any type of firewall.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable storage device containing computer-executable instructions of a media configurator control module for controlling a media relay via a media configurator, the media relay in communication with a network boundary device for opening and closing a media session through the network boundary device, the network boundary device separating a private address space and a public address space, the media relay being on the private address space side of the network boundary device, the media configurator control module comprising:

an event handler adapted to handle multimedia session events received from a proxy engine, the proxy engine for establishing a media session for sending a media stream from a sender to a recipient, the sender and the proxy engine being within the private address space and the recipient being within the public address space;

a local address resolver in communication with the event handler, the local address resolver adapted to determine if an address identifier belongs to the private address space and to determine at least one of a control element and a control group to be used to establish a media path with one end at the address identifier if the address identifier belongs to a private address space; and at least one control element in communication with the event handler, the at least one control element managing resources for a media relay wherein the multimedia session events include a session initiated message, the event handler, in response to receiving the session initiated message, is further adapted to determine via the local address resolver whether the media stream crosses the network boundary device between private and public address spaces;

reserve a media path for the media stream if the media stream does cross the network boundary device by sending a media path reservation request to a media configurator via the control element for the media configurator to reserve the media path including a port;

store the reservation made for the media path in a temporary storage if the reservation request is successful, the reservation indicating an address identifier reserved for the media path;

modify a session description so an address identifier for the media path is changed to the reserved address identifier; and send the modified session description to the proxy engine.

2. The computer-readable storage device of claim 1 wherein the at least one control element comprises a control group and at least on other control element.

3. The computer-readable storage device of claim 1 further comprising a media configurator, the media configurator adapted to communicate with the at least one control element and the media relay.

4. A computer-readable storage device containing computer-executable instructions of a media configurator control module for controlling a media relay via a media configurator, the media relay in communication with a network boundary device for opening and closing a media session through the network boundary device, the network boundary device separating a private address space and a public address space, the media configurator control module comprising:

an event handler adapted to handle multimedia session events received from a proxy engine, the proxy engine for establishing a media session for sending a media stream from a sender to a recipient, the sender and the proxy engine being within the private address space and the recipient being within the public address space;

a local address resolver in communication with the event handler, the local address resolver adapted to determine if an address identifier belongs to the private address space and to determine at least one of a control element and a control group to be used to establish a media path with one end at the address identifier if the address identifier belongs to a private address space; and at least one control element in communication with the event handler, the at least one control element managing resources for a media relay wherein the multimedia session events include a session initiated message, the event handler, in response to receiving the session initiated message, is further adapted to determine via the local address resolver whether the media stream crosses the network boundary device between private and public address spaces;

reserve a media path for the media stream if the media stream does cross the network boundary device by sending a media path reservation request to a media configurator via the control element for the media configurator to reserve the media path including a port;

store the reservation made for the media path in a temporary storage if the reservation request is successful, the reservation indicating an address identifier reserved for the media path;

modify a session description so an address identifier for the media path is changed to the reserved address identifier; and send the modified session description to the proxy engine further comprising a state refresh timer, the state refresh timer adapted to:

find control elements for which a state consistency check has not been run for longer than a defined period of time;

for each control element for which the state consistency check has not been run for longer than the defined period of time:

initiating the state consistency check, the state consistency check comprising:

locking the control element;

retrieving data on all address mappings established by the media relay the control element manages;

determining whether the media relay the control element manages and the control element have the same information on the established address mappings;

if a discrepancy is found between the mappings established by the media relay the control element manages and the information of the mappings mapped by the control element:

releasing ports associated with mappings that are mapped by the control element but are not in the current mappings in the media relay;

conditionally reserving mappings that are in the media relay but are not in the control element mappings; and unlocking the control element.

5. A computer-readable storage device containing computer-executable instructions of a media configurator control module for controlling a media relay via a media configurator, the media relay in communication with a network boundary device for opening and closing a media session through the network boundary device, the network boundary device separating a private address space and a public address space, the media configurator control module comprising:

an event handler adapted to handle multimedia session events received from a proxy engine, the proxy engine for establishing a media session for sending a media stream from a sender to a recipient, the sender and the proxy engine being within the private address space and the recipient being within the public address space;

a local address resolver in communication with the event handler, the local address resolver adapted to determine if an address identifier belongs to the private address space and to determine at least one of a control element and a control group to be used to establish a media path with one end at the address identifier if the address identifier belongs to a private address space; and at least one control element in communication with the event handler, the at least one control element managing resources for a media relay wherein the multimedia session events include a session initiated message, the event handler, in response to receiving the session initiated message, is further adapted to determine via the local address resolver whether the media stream crosses the network boundary device between private and public address spaces;

reserve a media path for the media stream if the media stream does cross the network boundary device by sending a media path reservation request to a media configurator via the control element for the media configurator to reserve the media path including a port;

store the reservation made for the media path in a temporary storage if the reservation request is successful, the reservation indicating an address identifier reserved for the media path;

modify a session description so an address identifier for the media path is changed to the reserved address identifier; and send the modified session description to the proxy engine wherein the multimedia session events include a session confirmed message, the event handler, in response to receiving the session confirmed message, is further adapted to retrieve reserved public address parameters for the media path, to send a media path open request to a media configurator with the reserved public address parameters; to modify a session description to refer to opened paths for the media path if the media path open request is successful; to send the modified session description to a proxy engine.

6. A computer-readable storage device containing computer-executable instructions of a media configurator control module for controlling a media relay via a media configurator, the media relay in communication with a network boundary device for opening and closing a media session through the network boundary device, the network boundary device separating a private address space and a public address space, the media configurator control module comprising:

an event handler adapted to handle multimedia session events received from a proxy engine, the proxy engine for establishing a media session for sending a media stream from a sender to a recipient, the sender and the proxy engine being within the private address space and the recipient being within the public address space;

a local address resolver in communication with the event handler, the local address resolver adapted to determine if an address identifier belongs to the private address space and to determine at least one of a control element and a control group to be used to establish a media path with one end at the address identifier if the address identifier belongs to a private address space; and at least one control element in communication with the event handler, the at least one control element managing resources for a media relay wherein the multimedia session events include a session initiated message, the event handler, in response to receiving the session initiated message, is further adapted to determine via the local address resolver whether the media stream crosses the network boundary device between private and public address spaces;

reserve a media path for the media stream if the media stream does cross the network boundary device by sending a media path reservation request to a media configurator via the control element for the media configurator to reserve the media path including a port;

store the reservation made for the media path in a temporary storage if the reservation request is successful, the reservation indicating an address identifier reserved for the media path;

modify a session description so an address identifier for the media path is changed to the reserved address identifier; and send the modified session description to the proxy engine wherein the multimedia session events include a session terminated message, the event handler, in response to receiving the session terminated message, is further adapted to obtain address parameters for the opened media paths for the media session, to send a request to close the media path with the address parameters to a media configurator; and to send a terminate session message to a proxy engine after the opened media paths have been closed.

7. A method in a media configurator controller for controlling a media configurator to control a media relay in communication with a network boundary device for opening and closing a media session through the network boundary device, the network boundary device separating a private address space and a public address space, the method comprising:

receiving events from a proxy engine, the events including messages to open and close a media session, the media session being between a sender with a sender address within the private address space and a recipient with a recipient address;

determining whether the recipient address is in the public address space such that the media session will cross the network boundary device; and when the media session will cross the network boundary device, reserving a media path for the media stream by determining a media configurator that is responsible for reserving the media path for the media stream, reserving a public port of the network boundary device for the media path, sending to the media configurator a media path reservation request, and when the reservation request is successful, storing an indication of the reserved port to the media path so that address identifiers are changed based on the reserved port wherein the media configurator receives the reservation request from the media configurator controller, converts the reservation request to a format that the media relay supports, forwards the converted reservation request to the media relay, receives a reply from the media relay, converts the reply to a format that the media configurator controller supports, and forwards the reply to the media configurator controller.

8. The method of claim 7 wherein the storing of an indication of the reserved port includes modifying a session description such that an address identifier for the media stream is changed to a reserved public address identifier corresponding to the reserved port.

9. The method of claim 8 including sending the modified session description to the recipient and notifying the sender of a private address identifier of the media relay.

10. The method of claim 9 including notifying the media relay to relay the media stream via the reserved public address identifier of the media path to the private address identifier of the sender and to relay the media stream sent via the private address identifier of the media path to the public address identifier of the recipient.

11. The method of claim 7 wherein the reserving of a media path includes determining a control element of a control group to establish the media path and to manage resources of the media relay.

12. The method of claim 11 including when a state consistency check for a control element has not been run for longer than a defined period of time, performing a consistency check by locking the control element;

retrieving data on all address mappings established by the media relay the control element manages;

determining whether the media relay and the control element have the same information on the established address mappings;

if a discrepancy is found, releasing ports associated with mappings that are mapped by the control element but are not in the current mappings in the media relay; and conditionally reserving mappings that are in the media relay but are not in the control element mappings; and unlocking the control element.

13. A method in a media configurator controller for controlling a media configurator to control a media relay in communication with a network boundary device, the network boundary device separating a private address space and a public address space, the network boundary device having a public address identifier, the method comprising:

receiving a session initiation request to initiate a media session between a sender and a recipient, the sender being identified by a sender address identifier within the private address space and the recipient being identified by a recipient address identifier within the public address space; and reserving a media path for the media stream by determining a media configurator that is responsible for reserving the media path for the media stream, reserving a public port of the network boundary device for the media path, sending to the determined media configurator a media path reservation request, and when the reservation request is successful, notifying the recipient of the public address identifier and reserved public port as one end of the media path and notifying the sender of a private address identifier of the media relay as the other end of the media path wherein the media configurator receives the reservation request from the media configurator controller, converts the reservation request to a format that the media relay supports, forwards the converted reservation request to the media relay, receives a reply from the media relay, converts the reply to a format that the media configurator controller supports, and forwards the reply to the media configurator controller.

14. The method of claim 13 wherein the storing of an indication of the reserved port includes modifying a session description such that an address identifier for the media path is changed to a reserved public address identifier corresponding to the reserved port.

15. The method of claim 14 including sending the session description to the recipient.

16. The method of claim 13 including notifying the media relay to relay the media stream received via the public address identifier and reserved public port to the sender address identifier and to relay the media stream sent via the private address identifier of the media path to the public address identifier of the recipient.

17. The method of claim 13 wherein the reserving of a media path includes determining a control element of a control group to establish the media path and to manage resources of the media relay.

18. The method of claim 17 including when a state consistency check for the determined control element has not been run for longer than a defined period of time, performing a consistency check by locking the control element;
retrieving data on all address mappings established by the media relay the control element manages;
determining whether the media relay and the control element have the same information on the established address mappings;
if a discrepancy is found,
releasing ports associated with mappings that are mapped by the control element but are not in the current mappings in the media relay; and
conditionally reserving mappings that are in the media relay but are not in the control element mappings; and
unlocking the control element.

* * * * *